May 3, 1949.   R. E. LA POINTE   2,469,198
AIR CHUCK
Filed March 23, 1946

INVENTOR.
RAYMOND E. LA POINTE.
BY
*Louis V. Lucia*
ATTORNEY

Patented May 3, 1949

2,469,198

UNITED STATES PATENT OFFICE 2,469,198

AIR CHUCK

Raymond E. La Pointe, Hartford, Conn., assignor to The Bush Manufacturing Company, Hartford, Conn.

Application March 23, 1946, Serial No. 656,610

6 Claims. (Cl. 279—4)

This invention relates to air chucks and more particularly to chucks that are especially adapted for attaching a compressed air pipe or hose to a tube.

An object of this invention is to provide a chuck which may be quickly connected to the tube in such a manner as to firmly grip the tube and permit compressed air to be forced into the tube.

A further object of the invention is to provide such a chuck which is operatable by compressed air that passes through said chuck into the tube and responsive to the control of the compressed air for closing or opening an element for gripping said tube.

Further objects and advantages of this invention will be more clearly understood from the following description and from the accompanying drawings in which—

Figure 1:
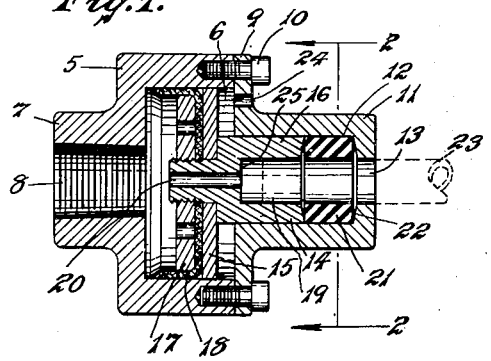
Fig. 1 is a side view, in central vertical section, of a chuck embodying my invention.
Figure 2:
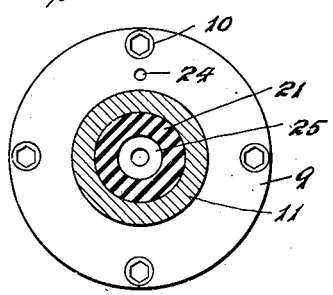
Fig. 2 is an end view thereof in section on the line 2—2 of Fig. 1.

As shown in the drawings, my improved chuck may comprise a body 5 having a cylindrical bore 6 therein and a hub 7 with a threaded hole 8 for attaching said chuck to the end of a pressure conductor which may be either rigid or flexible.

A cover 9 is secured to said body 5, by means of screws 10, and has a hub 11 in which there is a bore 12 opening through an aperture 13 in the end of the hub 11. A piston 14 is slidably contained within the bore 6. This piston preferably comprises a disk 15 which is secured to a plunger 16 and retained in position by a nut 17 which also secures a flexible washer, or packing 18, in said piston against the disk 15.

The plunger 16 is slidable within the bore 12 and has a recess 19 which is in alignment with the opening 13 and connects with an air passage 20 through the piston.

A gripping member, preferably in the form of a resilient bushing 21, is contained in the bore 12 between the shoulder 22, at the end of the bore, and the end of the plunger 16, the inside diameter of said bushing, in its normal condition, being substantially equal to the diameter of the opening 13 and the recess 19.

My improved chuck is particularly adapted for use in testing tubular coils, such as used in radiators, condensers and the like, against leakage but it may also be used for other purposes where it may be desired to connect a source of pressure to another member.

The operation of my improved chuck, when it is connected to pressure, such as compressed air, is as follows:

The end of a tube which is to be tested, indicated in dotted lines at 23, is inserted, through the opening 13 and the bushing 12, into the recess 19. A valve, not shown, is then operated to permit the compressed air to flow through the said chuck. The said air will then fill the bore 6, in front of the piston, and immediately force said piston to move the plunger 16 against the bushing 21 and compress said bushing endwise so as to cause it to expand inwardly against the outer periphery of the tube 23 and thereby firmly grip said tube. The air pressure will then continue to flow through the opening 20 and into the tube while still compressing the bushing and gripping the tube; a vent opening 24 being provided in back of the piston to release air from that side of the bore 6 and thereby retain the piston under pressure as long as the compressed air is flowing through the chuck and the opening 20 into the tube 23.

Upon closing the air valve, to shut off the compressed air, the pressure still remaining in the tube will act against the shoulder 25, at the end of the recess 18, and force the plunger and piston away from the bushing 21, thus causing the bushing to retract and release the tube. If desired, a suitable vent may be provided in the air valve to release pressure from the piston upon closing of the valve and thereby permit rapid opening operation of the chuck.

Figure 3:
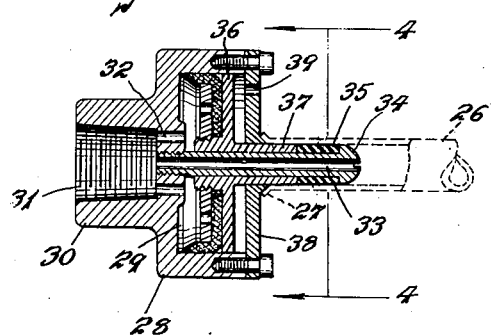
Fig. 3 is a side view, in central vertical section, showing a modified form of my invention.
Figure 4:
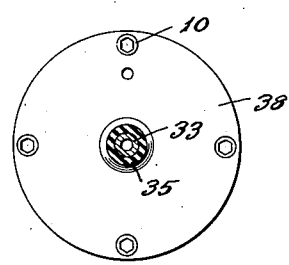
Fig. 4 is an end view in section on the line 4—4 of Fig. 3.

In Fig. 3 of the drawings, there is shown a modified form of a chuck which also embodies my invention and which is especially constructed for use with flanged tubes wherein the tube, indicated in dotted lines at 26, is provided with a flange 27 such as commonly used with a connector for connecting tubes to fittings. In this form, the chuck has a body portion 28 with the bore 29 therein and the hub 30 with the threaded recess 31 which connects with the bore 29 through apertures 32.

A tubular member 33 is threaded in the body 28 and communicates with the hole 31. This member has a head 34 providing a shoulder against which is seated a resilient sleeve 35 which surrounds the member 33.

A piston 36 is slidable within the bore 29 and is connected to a sleeve 37 which slides over the tubular member 33.

A cover 38 is secured to the body 28 and has an opening therein through which projects the sleeve 37. The said cover is also provided with a vent 39.

The operation of this modified form of chuck is as follows:

When the said chuck is connected to a source of pressure, as above described, the end of the tubular member 33 with the sleeves 35 and 37 thereon may be inserted into the end of the tube 26. The air valve is then opened and pressure will flow through the passages 32 into the cylinder bore 28 and force the piston outwardly causing the sleeve 37 to slide against the resilient sleeve 35 and compress said resilient sleeve between the shoulder on the head 34 and the end of the sleeve 37; thus causing the resilient sleeve to expand against the inner wall of the tube and firmly grip said tube while the compressed air is admitted into the tube through the opening in the tubular member 33.

Upon closing the air valve, the drop in pressure within the cylindrical bore 29 will cause the piston to move back and thus permit the resilient sleeve 38 to release the tube.

I claim:

1. A chuck of the character described comprising a body having a chamber therein, a piston slidable in said chamber, a compressible gripping member, a plunger operable by said piston for compressing said gripping member, means for admitting pressure against said piston to cause compression of said gripping member for a gripping operation, and passage means extending through said chuck and gripping member for permitting the passage of pressure therethrough into a separate member gripped in said chuck.

2. A chuck of the character described comprising a body having a chamber therein, a piston slidable in said chamber, a resilient sleeve, a plunger operatable by said piston for compressing said sleeve, an opening in said body in alignment with the interior of the sleeve, and means for admitting pressure against said piston to cause compression of said sleeve for reducing the inside diameter thereof.

3. An air chuck of the character described comprising a body having a cylindrical chamber therein, a piston slidable in said chamber, a recess extending from said chamber and having an opening communicating therewith through said body portion, a resilient member seated in the bottom of said recess, a plunger connected to said piston and slidable in said recess, a recess in said plunger in alignment with said opening and with the inside of said sleeve, an air passage through said piston and plunger communicating with the recess in the plunger, and means for admitting pressure into said chamber to move said piston and thereby cause operation of said plunger for compressing said sleeve and permitting said pressure to pass through the passage in said plunger and enter into a member engaged by said sleeve.

4. An air chuck of the character described comprising a body having a cylindrical bore therein, a threaded hub for securing said chuck to a pressure outlet, a cover on said body, a vent in said cover, a hub projecting from said cover and having an axial bore therein and an opening extending from said bore through the end of the hub, a resilient sleeve seated against the bottom of said bore adjacent to said opening and having an opening therein in alignment with the opening in the cover, a piston slidable in said chamber, a plunger connected to said piston and extending into said bore with the end thereof in engagement with said resilient sleeve, a recess extending into said plunger in alignment with the openings in the cover and the sleeve, and an air passage extending through said piston and communicating with said bore in the plunger.

5. A chuck of the character described comprising a body having a cylindrical bore therein, a cover secured to said body, a piston slidable in said bore, a member secured to said body and extending through said piston, a shoulder adjacent the end of said member, a resilient sleeve surrounding said member and abutting said shoulder, an operating sleeve connected to said piston and slidable over said member, the said body having passages communicating with said bore, and means for admitting pressure through said passages into said bore to operate said piston for sliding said operating sleeve against the end of the resilient sleeve and thereby cause outward expansion thereof for gripping a member in which said resilient sleeve is inserted.

6. A chuck of the character described comprising a body having a cylindrical bore therein, a cover secured to said body, an opening in said cover, a vent in said cover, a tubular member secured to said body and extending through said opening in the cover, a shoulder adjacent the end of said tubular member, a resilient sleeve surrounding said tubular member and seated against said shoulder, a piston surrounding said tubular member and slidable in said bore, an operating sleeve connected to said piston and slidable over said tubular member and extending through the opening in the cover for compressing said resilient sleeve, the said body having passages communicating with said bore, and means for admitting pressure through the openings in said body into said bore for operating said piston to compress said resilient sleeve and cause outward expansion thereof for gripping a member and permitting the supply of pressure through the said tubular member.

RAYMOND E. LA POINTE.

REFERENCES CITED

The following references are of record in the file of this patent:

UNITED STATES PATENTS

| Number | Name | Date |
| --- | --- | --- |
| 421,657 | Bowers | Feb. 18, 1890 |
| 895,438 | Delany | Aug. 11, 1908 |
| 1,236,453 | Lavoie | Aug. 14, 1917 |
| 1,412,170 | Dixon | Apr. 11, 1922 |
| 1,690,541 | Kuzeleuski | Nov. 6, 1928 |
| 1,911,938 | Bard | May 30, 1933 |
| 2,004,787 | Gillette | June 11, 1935 |
| 2,366,778 | Feichter | Jan. 9, 1945 |